US006939261B1

(12) United States Patent
Pollman

(10) Patent No.: US 6,939,261 B1
(45) Date of Patent: Sep. 6, 2005

(54) COMPACT VEHICLE TRANSMISSION

(75) Inventor: Frederic W. Pollman, Eden Prairie, MN (US)

(73) Assignee: Sauer-Danfoss, Inc., Ames, IA (US)

( * ) Notice: Subject to any disclaimer, the term of this patent is extended or adjusted under 35 U.S.C. 154(b) by 0 days.

(21) Appl. No.: 10/829,798

(22) Filed: Apr. 22, 2004

Related U.S. Application Data

(63) Continuation of application No. 10/051,252, filed on Jan. 18, 2002, now abandoned.

(60) Provisional application No. 60/262,328, filed on Jan. 18, 2001.

(51) Int. Cl.[7] .............................................. F16H 47/04
(52) U.S. Cl. ....................... 475/72; 475/80; 74/732.1; 74/606 R
(58) Field of Search .............................. 475/73, 78, 80, 475/83, 72; 74/732.1, 733.1, 606 R; 60/487, 60/492

(56) References Cited

U.S. PATENT DOCUMENTS

| | | | |
|---|---|---|---|
| RE27,307 E | | 3/1972 | De Lallo |
| 4,096,768 A | | 6/1978 | Miyao |
| 4,261,229 A | * | 4/1981 | Mizuno et al. ............... 477/68 |
| 4,341,131 A | | 7/1982 | Pollman |
| 4,976,664 A | * | 12/1990 | Hagin et al. .................. 475/80 |
| 4,976,665 A | * | 12/1990 | Hagin et al. .................. 475/80 |
| 5,186,692 A | | 2/1993 | Gleasman et al. |
| 5,364,316 A | | 11/1994 | Brambilla |
| 5,421,790 A | | 6/1995 | Laseon |
| 5,913,950 A | * | 6/1999 | Matsufuji .................. 74/730.1 |
| 6,358,174 B1 | | 3/2002 | Folsom et al. |
| 6,450,912 B2 | | 9/2002 | Todeschini |

FOREIGN PATENT DOCUMENTS

| | | | |
|---|---|---|---|
| JP | 2000-127782 | * | 5/2000 |
| JP | 2000177418 | | 6/2000 |

* cited by examiner

*Primary Examiner*—Ha Ho

(57) ABSTRACT

A small engine transmission having a hydromechanical transmission unit providing a first power path, and a mechanical power transmission unit providing a second power path. The mechanical power transmission is a planetary gear system having a planetary carrier. The hydromechanical transmission is associated with the mechanical transmission to decrease average hydraulic power flow of the engine transmission to thereby increase operating efficiency and to permit the reduction of an output speed range to reduce transmitted power for the use of multiple modes to achieve a full torque and speed range of the transmission.

15 Claims, 13 Drawing Sheets

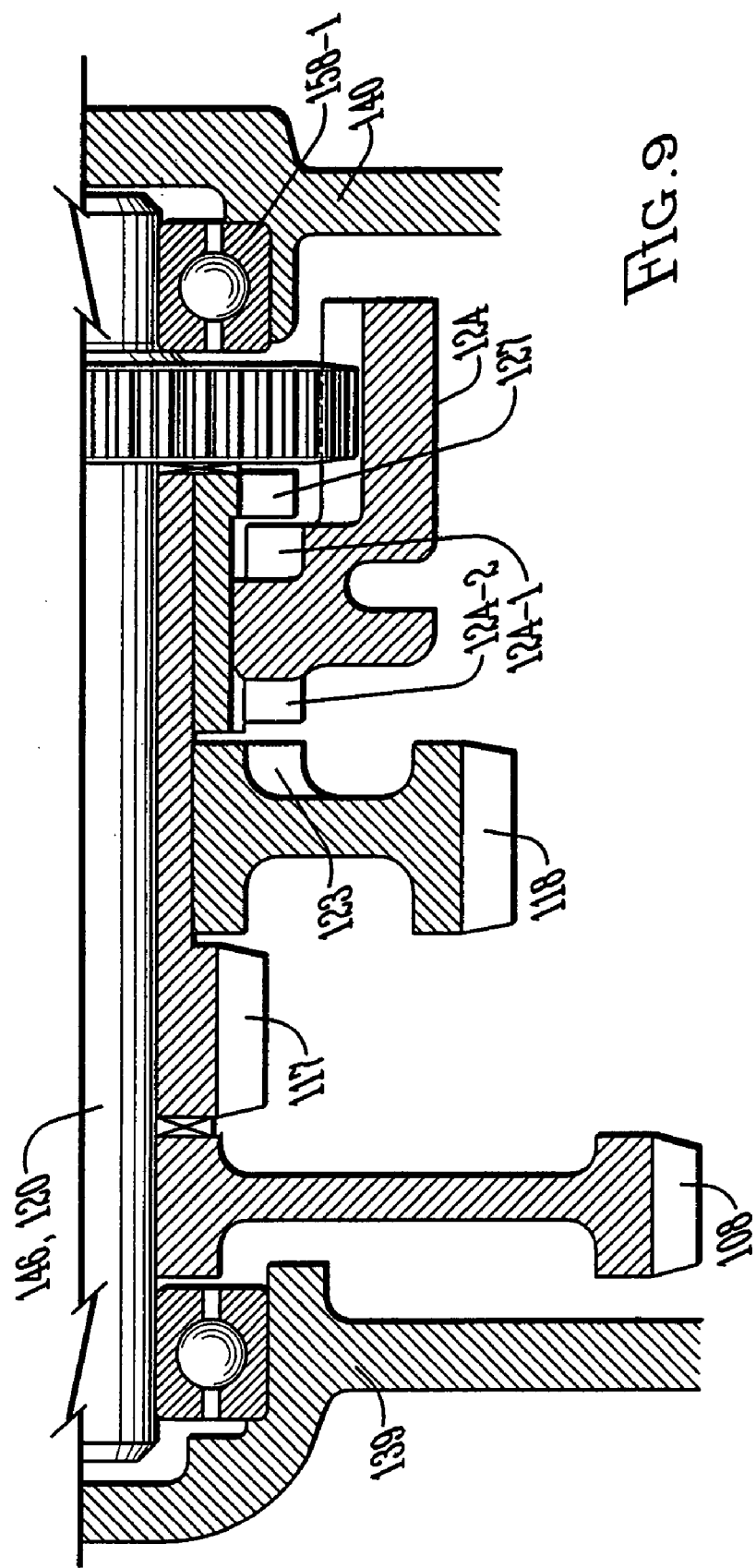

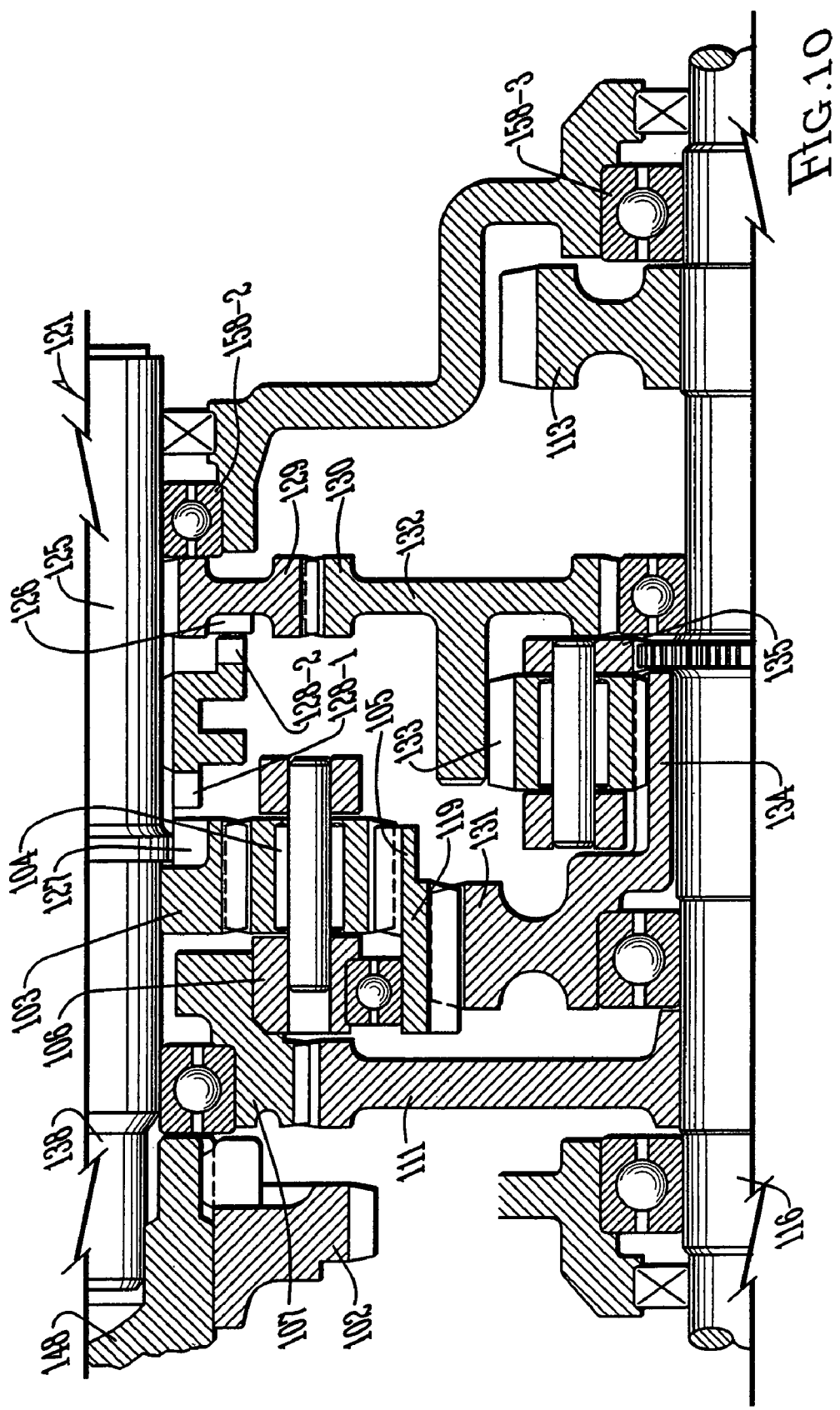

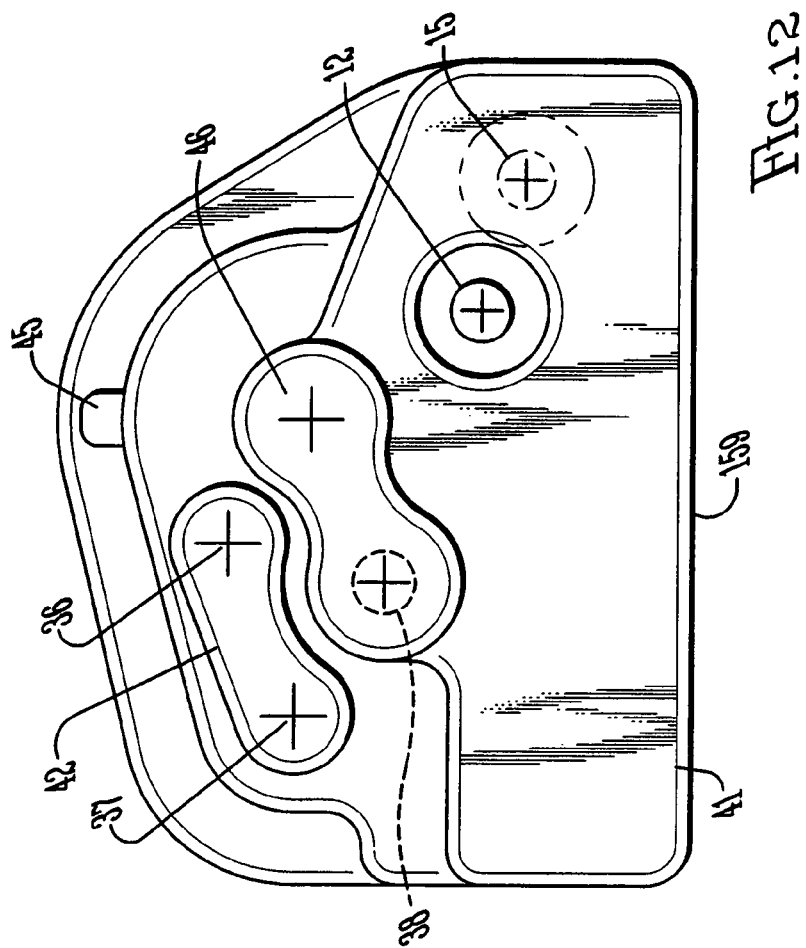

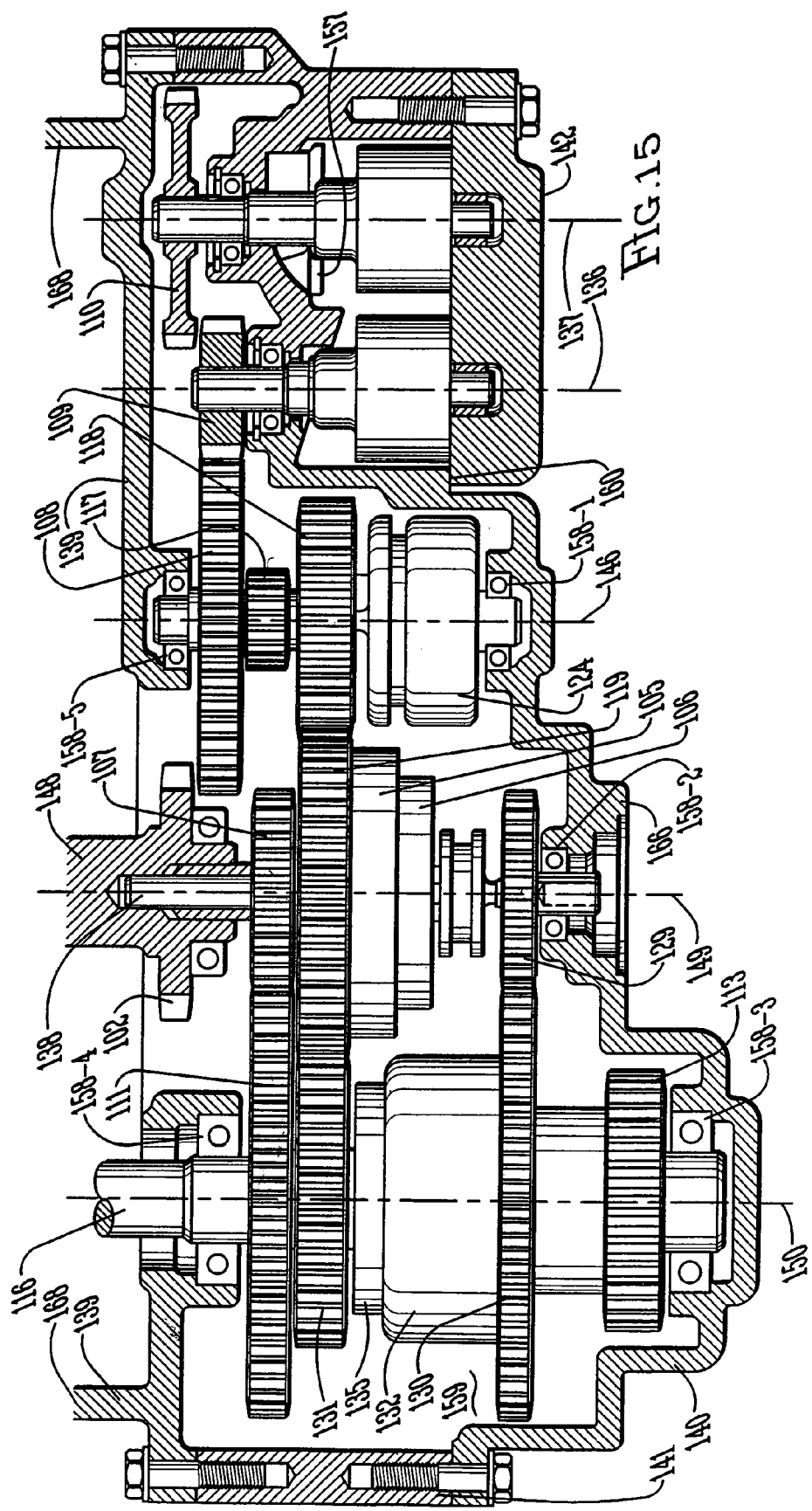

COMPACT VEHICLE TRANSMISSION

CROSS REFERENCE TO A RELATED APPLICATION

This application is a continuation of U.S. application Ser. No. 10/051,252, filed Jan. 18, 2002, now abandoned, which claims the benefit of U.S. Provisional application Ser. No. 60/262,328 filed Jan. 18, 2001.

BACKGROUND OF THE INVENTION

There are a number of small vehicles which preferably should have "automatic" transmissions for ease of driving and for increased utility. These include ATV's, tractors, utility vehicles and small automobiles. These vehicles are generally in the 25 HP to 50 HP range, and have common requirements for low cost, high efficiency, good controllability and short length. Many vehicles require through power from the engine out the back of the transmission; many vehicles require drive to both front and rear axles. Some of these vehicles currently integrate the engine and transmission into a single package.

However, there can be a wide range in the required transmission ratio spread which varies by vehicle vocation. Further, the transmission configuration varies with the specific vehicle design. Both of these issues can be major determinants of cost. There are some differences in engine speed, which can affect the sizing of the transmission components. In consideration of these variations, the individual vehicle volumes are generally not enough to support low cost manufacturing.

It is therefore a principal object of this invention to provide a small engine transmission which has the ability to change all gears ratios in order to accommodate various input speeds, output speeds and ratio spread requirements.

A further object of the invention is to provide a small engine transmission which has a transmission configuration which allows for through power transmission from the engine to the opposite end of the transmission and for through power transmission of the output shaft to either or both ends.

A still further object of this invention is to provide a small vehicle transmission that has a transmission configuration which has a center housing portion which contains features and location for two hydrostatic units including shafts and drive gears, the hydraulic reservoir and one set of clutch shift means, and which is common across the range of transmission applications.

A still further object of this invention is to provide a small vehicle transmission which allows for integration and common usage of one or more engine/transmission features including gears, hydraulic pump, housing and/or controller.

These and other objects will be apparent to those skilled in the art.

SUMMARY OF THE INVENTION

This invention provides an HMT which accommodates the range of vehicle needs with a basic design approach, and provides for adapting the basic unit for different vehicle requirements while retaining many key transmission components across a range of vehicles. It provides an HMT with either two or three modes which depend on the application requirement. The third mode is independent in ratio spread from the other two modes. The third mode is accomplished with the addition of a planetary, four associated drive gears and one clutch to the basic 2-mode package.

Hydromechanical transmissions are characterized by a hydrostatic transmission power path in parallel with a mechanical power transmission path, arranged in a manner to decrease the average power flow through the hydrostatic portion and thereby increase operating efficiency. Typically, the mechanical power path includes a planetary gear set which acts to sum the power flows at either the input or output end of the transmission.

The existence of parallel power paths creates the possibility of reducing the output speed range or torque ratio in order to further reduce transmitted hydrostatic I. power; this then requires multiple ranges or "modes" to achieve the full torque and speed range of the transmission. The impact of multiple modes is to improve efficiency and sometimes to reduce cost. In addition to efficiency and cost, the magnitude of the output speed range/torque ratio in each mode has an impact on input power capacity relative to the size of the HST. Smaller ratios allow larger input power for the same size hydrostatic units. It is obvious that more modes allow either smaller mode ratios or larger transmission ratios or both. These relationships create the possibility for having a versatile design configuration which accommodates a number of market needs for input power, ratio range and efficiency.

Since a hydrostatic transmission is a part of the unit, one or more of the modes can be hydrostatic, which is usually the start-up range, or mode 1.

Multi-mode HMT's are usually accomplished by reusing the hydrostatic components and clutching to a different mechanical component. The mechanical component will be a planetary if the mode is hydromechanical. Usually the modes are arranged so that there is no ratio change during the shift in order to have continuous speed or torque delivery. Also, the hydrostatic transmission is usually stroked over center from full positive displacement to full negative displacement in order to fully utilize the installed hydrostatic power. Under these conditions, the mode shift must be done with a reversal of power flow in the hydrostatic transmission; a reversal of losses must be accounted for in order to achieve smooth, continuous shifts. When making a shift, a planetary element different from any other mode must be used if the speed/torque ratio of the mode is to be independently selected from the other modes.

BRIEF DESCRIPTION OF THE DRAWINGS

FIG. 9 is a partial sectional view of a gear and clutch arrangement for a 3-mode HMT;

FIG. 10 is a further sectional view similar to that of FIG. 9 but showing additional related structure;

FIG. 11 is an end elevational view of a 2-mode HMT in a stand-alone configuration;

FIG. 12 is a side elevational view of the structure of FIG. 11;

FIG. 15 is a sectional view of a 3-mode HMT housing configuration.

DESCRIPTION OF THE EMBODIMENTS OF THE INVENTION

Figure 1:
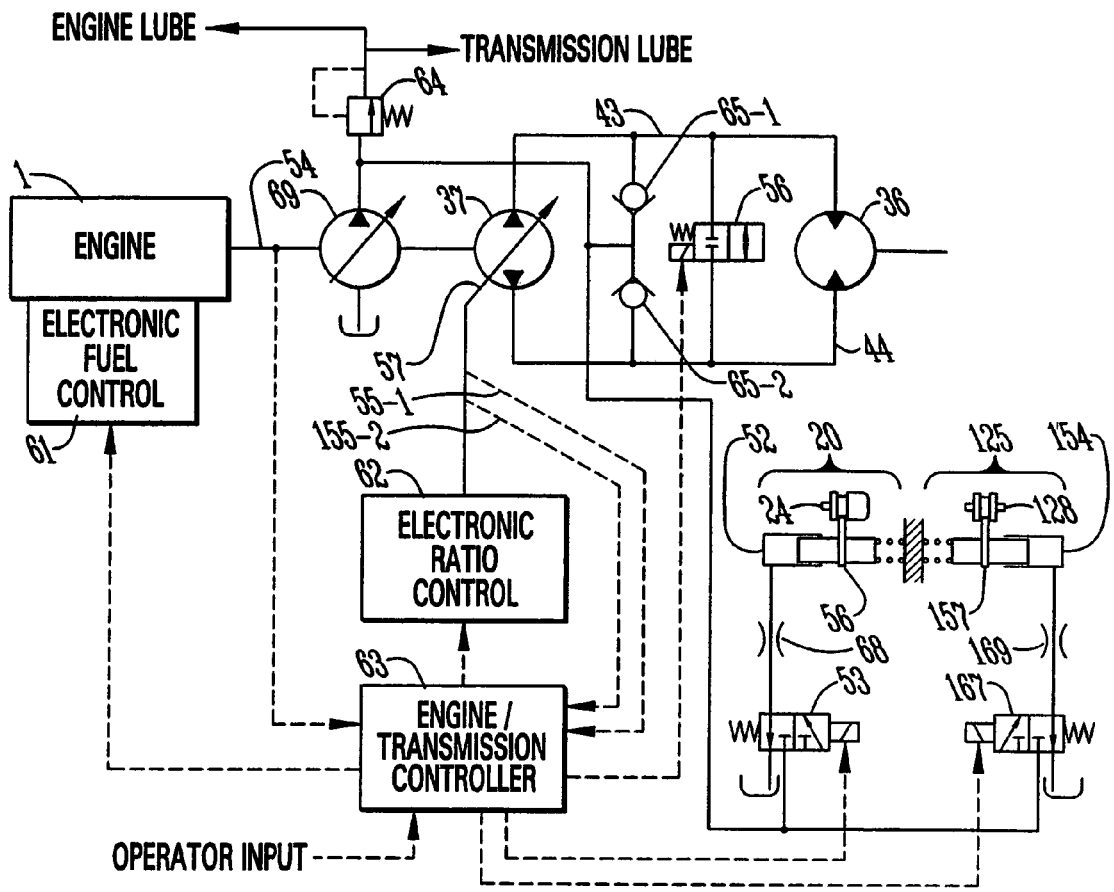
FIG. 1 is a schematic drawing of the HMT/Engine circuit integration of this invention.

FIG. 1 shows a single low pressure pump 69 which supplies charge oil to the HST 51, through check valves 65-1 and 65-2, and to shift valves 53 and 155. Pump 69 also supplies low pressure lube oil to both the engine and transmission after passing through relief valve 64. This pump can be located in either engine 1 or on HST 51, or there may be one pump on each element if desired. Controller 63 receives signals from both engine 1 and HST 51 and sends control signals to engine controller 61, transmission controller 62, loop crossport valve 56, and shift valves 53 and 167. Both the engine and transmission could have separate controllers if desired, but signal communication may be necessary to perform certain integrated control functions. Refer to U.S. Pat. No. 5,560,203.

A 2-mode HMT is shown in FIGS. 1, 2, 3, 4, 11 and 12.

Figure 2:
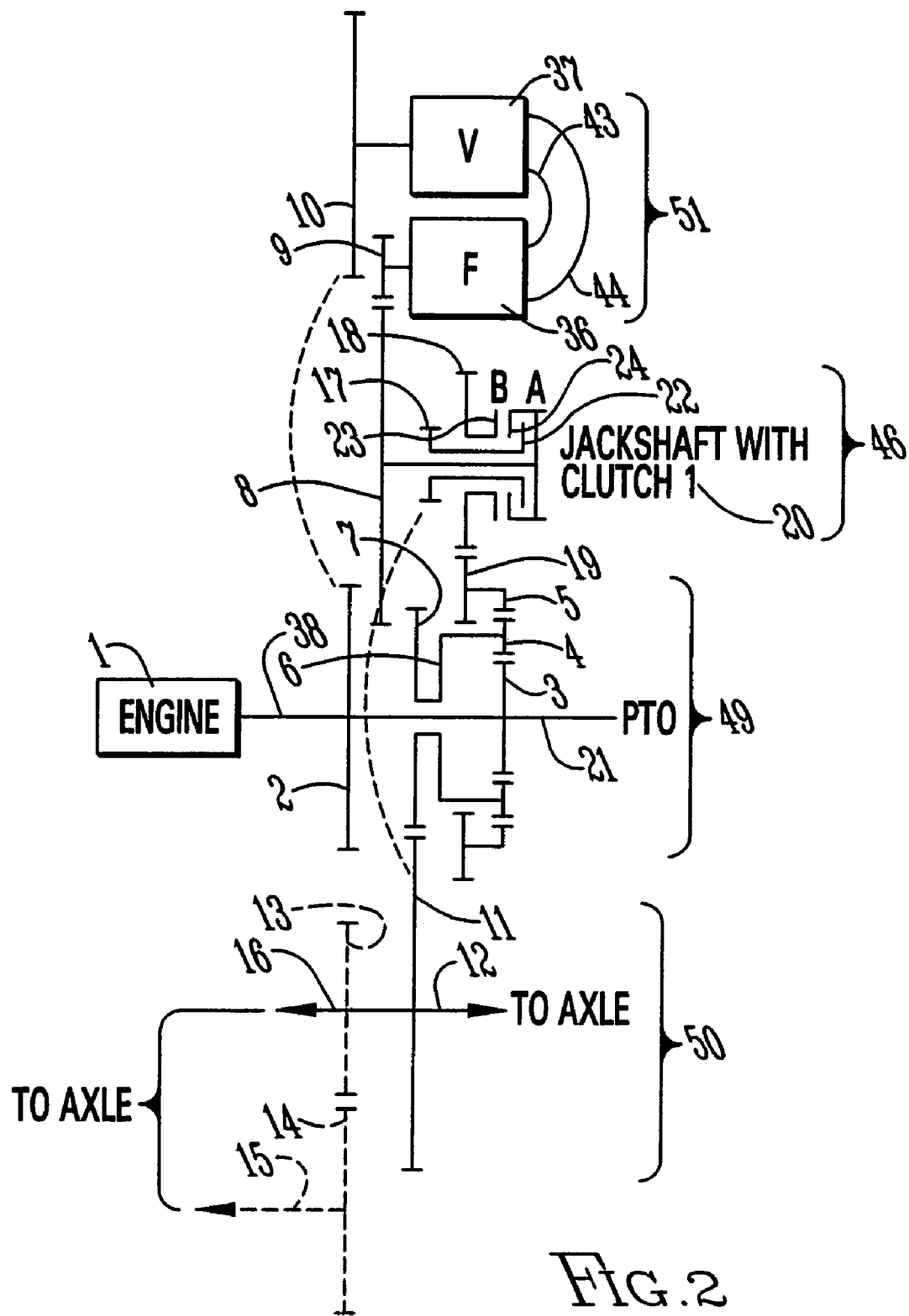
FIG. 2 is a schematic drawing of a two-mode HMT.

A 2-mode hydromechanical transmission which has one mode change is shown in FIG. 2. There is a hydrostatic transmission 51, a jackshaft 46 with a mechanical clutch 20, a planetary 49 and output shaft 50. The HMT comprises a fixed swashplate control (F-unit) operatively connected to a variable swashplate control (V-unit). The HMT starts in a hydrostatic mode of operation with clutch 20 in position A. In this position, a tang in slider 24 is drivingly engaged in slot 22 of an extension of gear 17. Power is transmitted from engine 1 through gear set 2/10, from HST 51 through gear set 9/6, from jackshaft 46 through gear set 17/11 to output 50. In mode 2, power must be transmitted through HST 51 and through planetary 49. Clutch 20 must be in position B to accomplish this.

The shift sequence is initiated by a signal when the end of mode 1 of the HMT has been reached. This preferably is done with a displacement signal from the V-unit 37 such as swashplate position sensor 55-1, but may also be done with V and F-unit speed and pressure signals. At this time, clutch 20 engages slider 24 with tangs 24-2, and gear 18 with slots 23 are at pre-synchronous speed and the F-unit 36 is running slower than the V-unit 37 (assuming equal displacement units). The amount of speed differential is dependent on the power being transmitted and the sizing of the transmission 51, but would typically be less than 15%. The controller 63 would immediately stop fuel supply to engine 1 through controller 61 which stops the delivery of power and the tendency for the engine speed to increase during the shift sequence. Clutch 20 is then disengaged from the power source in the transmission by signaling valve 53. Cylinder 52 moves yoke 56 and slider 24 to disengage tang 24-1 from slot 22. As power is flowing in a positive direction, F-unit 36 is acting as a motor and the loop pressure decrease in line 43 will allow F-unit 36 to increase its speed to be substantially equal to V-unit 37 as soon as clutch 20 is disengaged. After F-unit 36 speeds up and loop pressure in line 43 is low, control 63 engages crossport valve 56 to enable differential flow across the loop and differential speed between F-unit 36 and V-unit 37 with low pressure drop. Control 63 then engages clutch 20 to position B by further moving slider 24 with yoke 56 and cylinder 52. This engages tang 24-2 with slot 23 and enables drive of gear set 18/19. While there is a differential speed between tang 24-2 and slot 23, the engagement is made at a reduced differential speed and low power condition. During engagement, clutch 20 speeds up the F-unit 36 to a plus-synchronous amount as it must act as a pump after the completion of the shift. Transmission elements are sized to allow for the correct amount of speed differential to permit the displacement of V-unit 37 to remain nearly constant before and after the shift. Control 63 then restores engine fuel with controller 61 and closes loop crossport valve 56. Valve 56 is always open or closed. If it is open, no power results. This is the meaning of the term "crossport". Power delivery resumes in mode 2 with the power flow in HST 51 reversed and the transmission ratio remaining unchanged.

FIG. 1 shows only one shift valve for each clutch for sequencing the slider with the crossport valve. The shift sequence is completed in a fraction of a second and would be done on a timed basis. Flow control orifice 68 and 169 are used to regulate the speed of cylinder 52 and 154 In order to time the shift functions properly. It should be noted that it could also be done on an event tracking basis which would require the addition of a second shift valve to control the position of the slider midway between its engagement points, and sensors to monitor the shift events.

Figure 3:
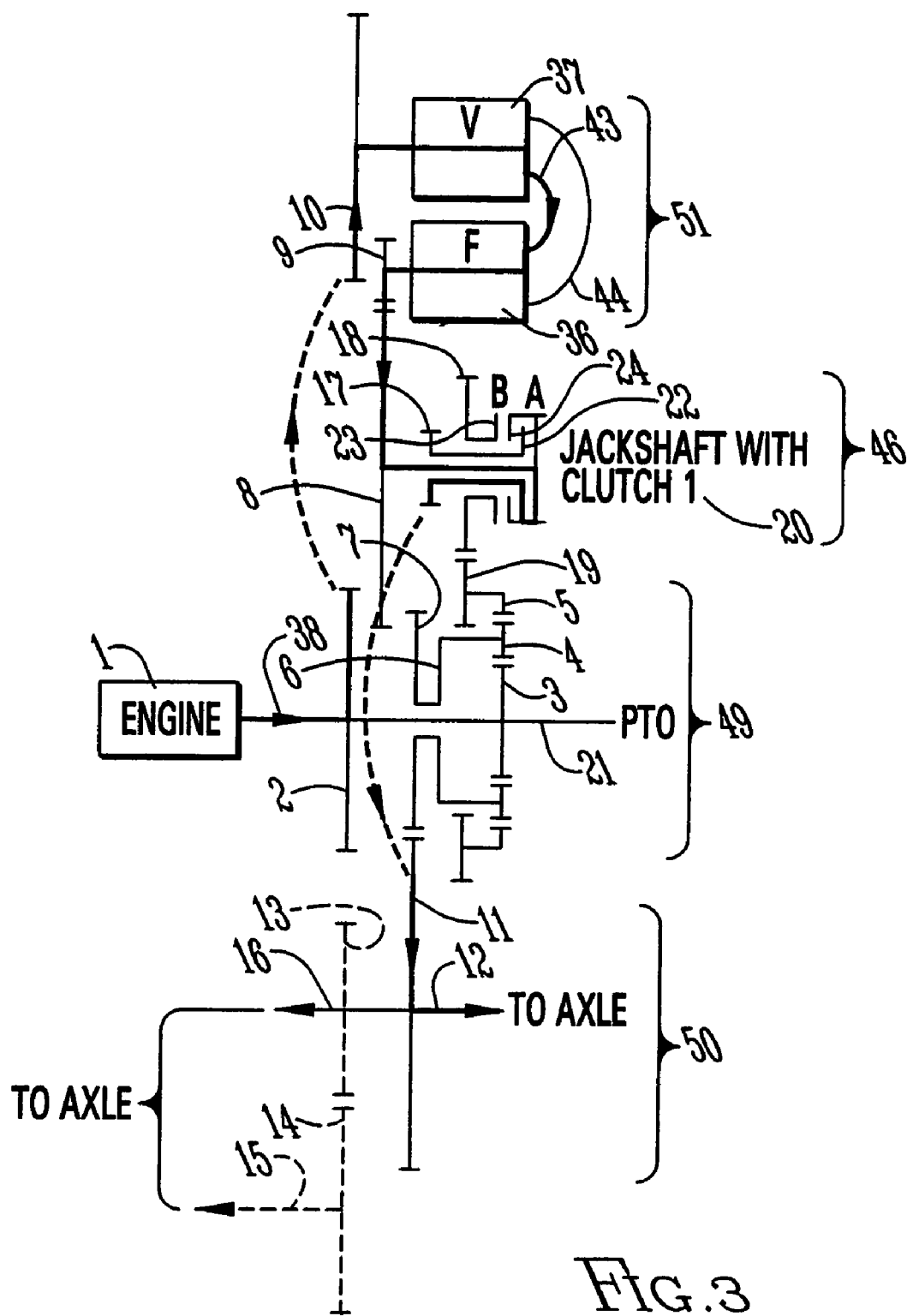
FIG. 3 is a schematic drawing showing a first mode for the circuit of FIG. 2.
Figure 4:
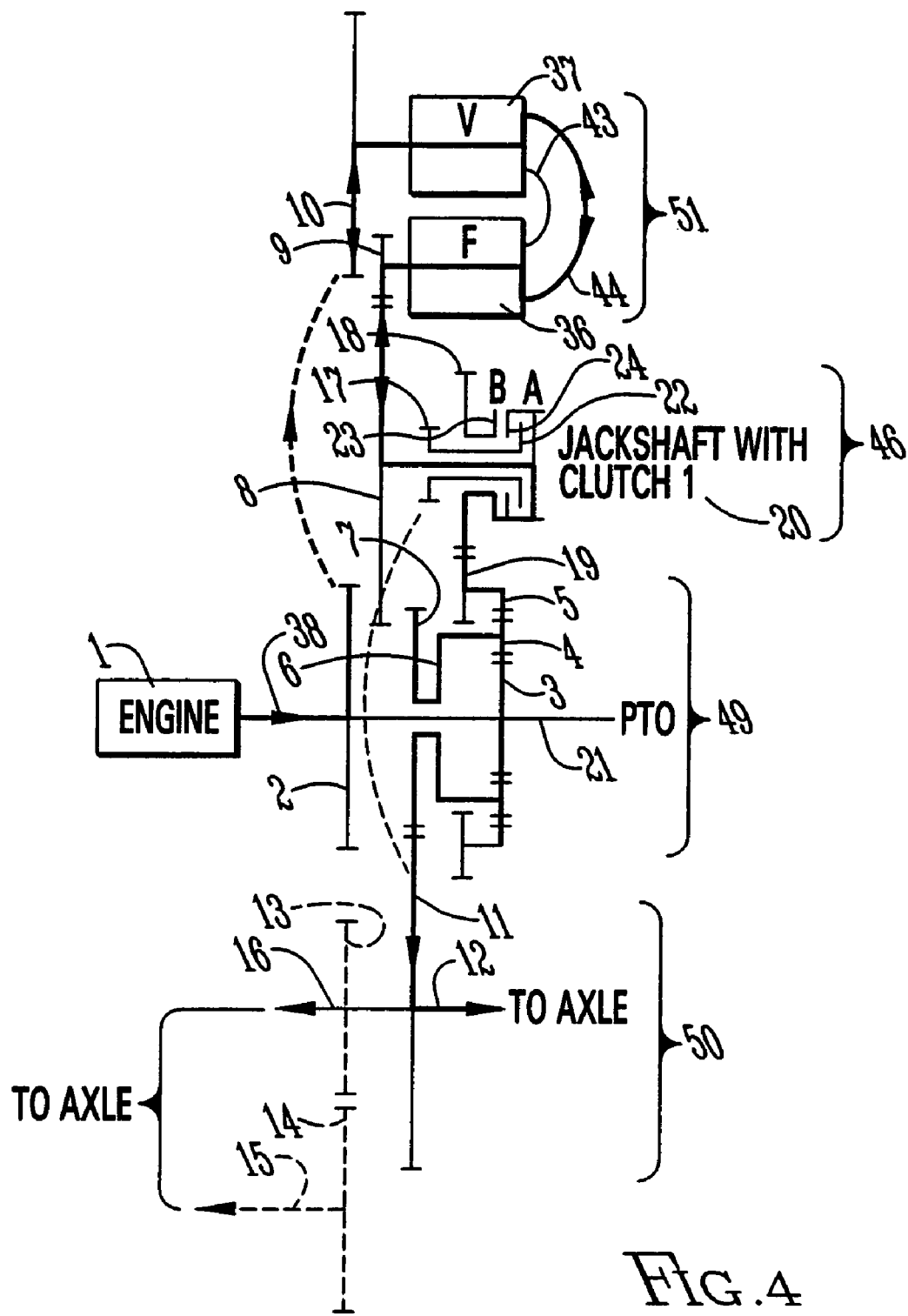
FIG. 4 is a schematic drawing showing a second mode for the circuit of FIG. 2.
Figure 5:
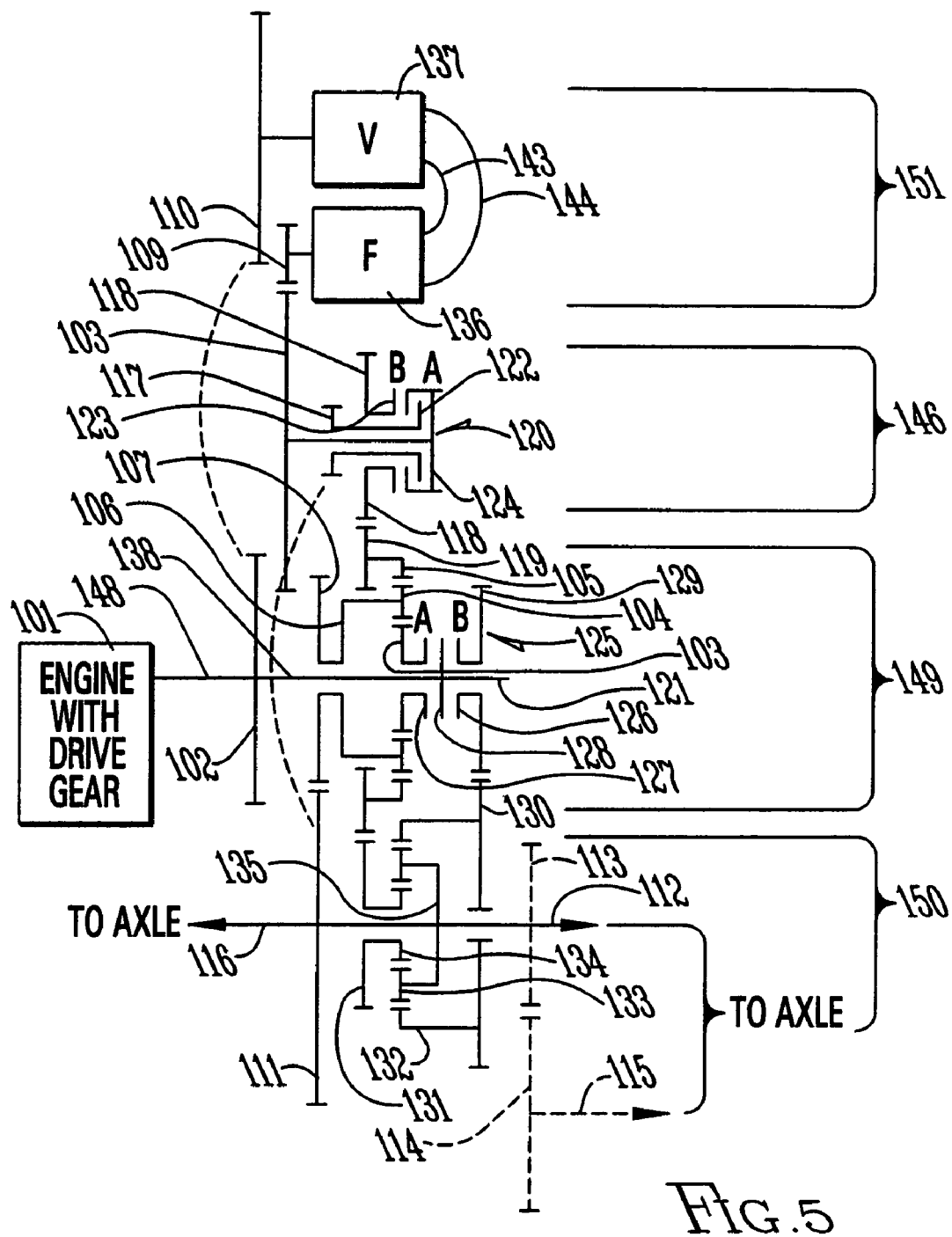
FIG. 5 is a schematic drawing of a 3-mode HMT.
Figure 6:
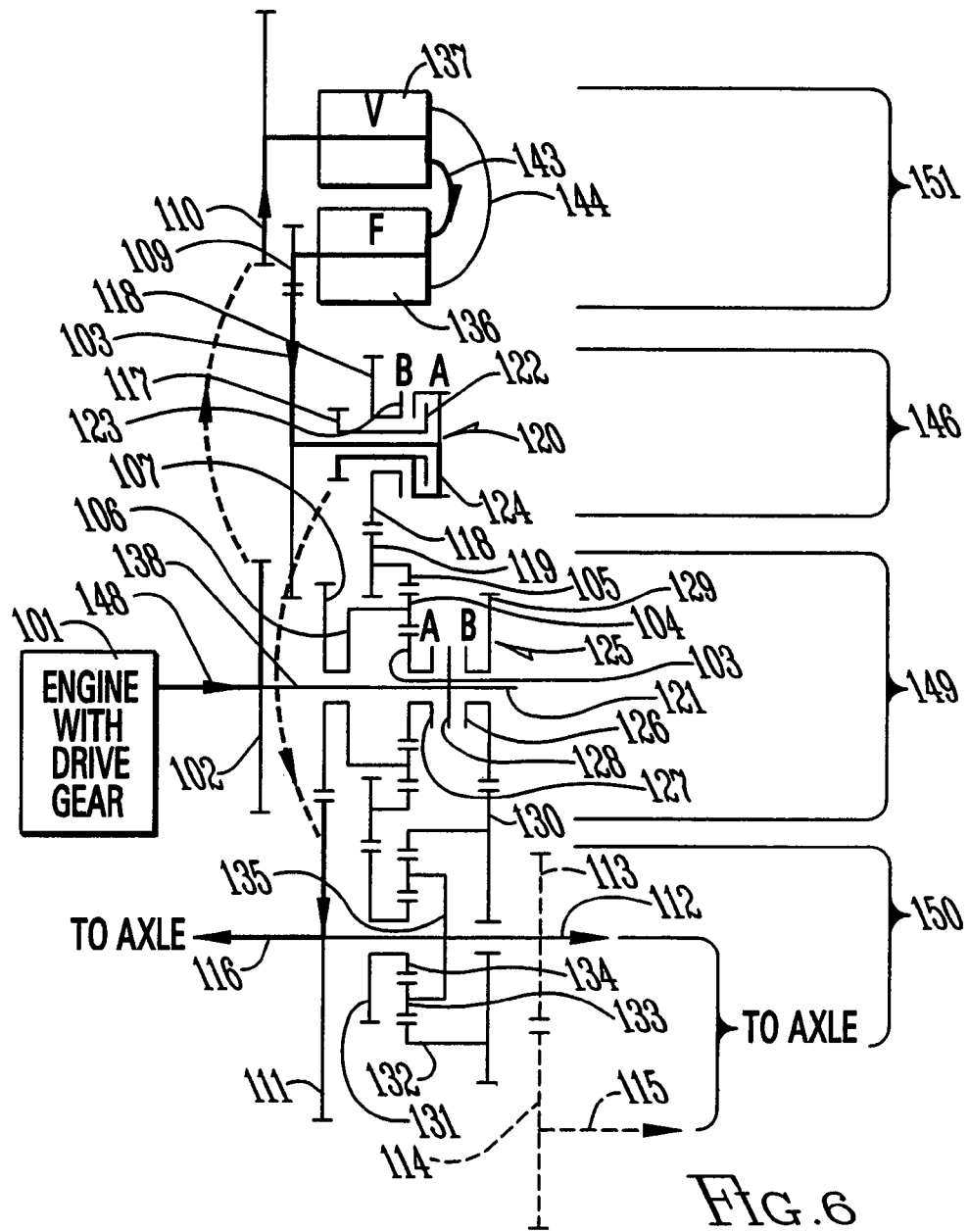
FIG. 6 is a schematic drawing showing a first mode for the circuit of FIG. 5.
Figure 7:
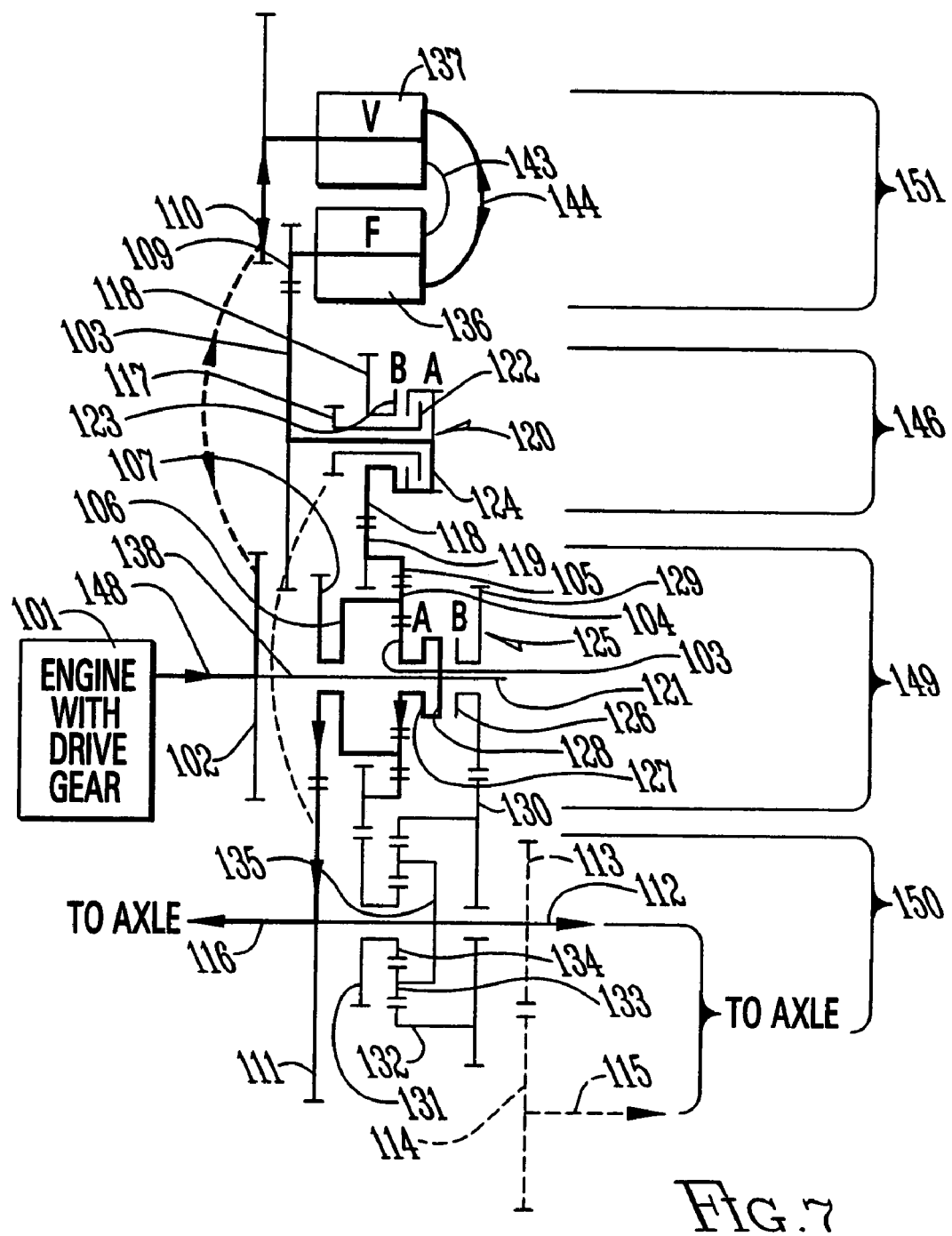
FIG. 7 is a schematic drawing showing a second mode for the circuit of FIG. 5.
Figure 8:
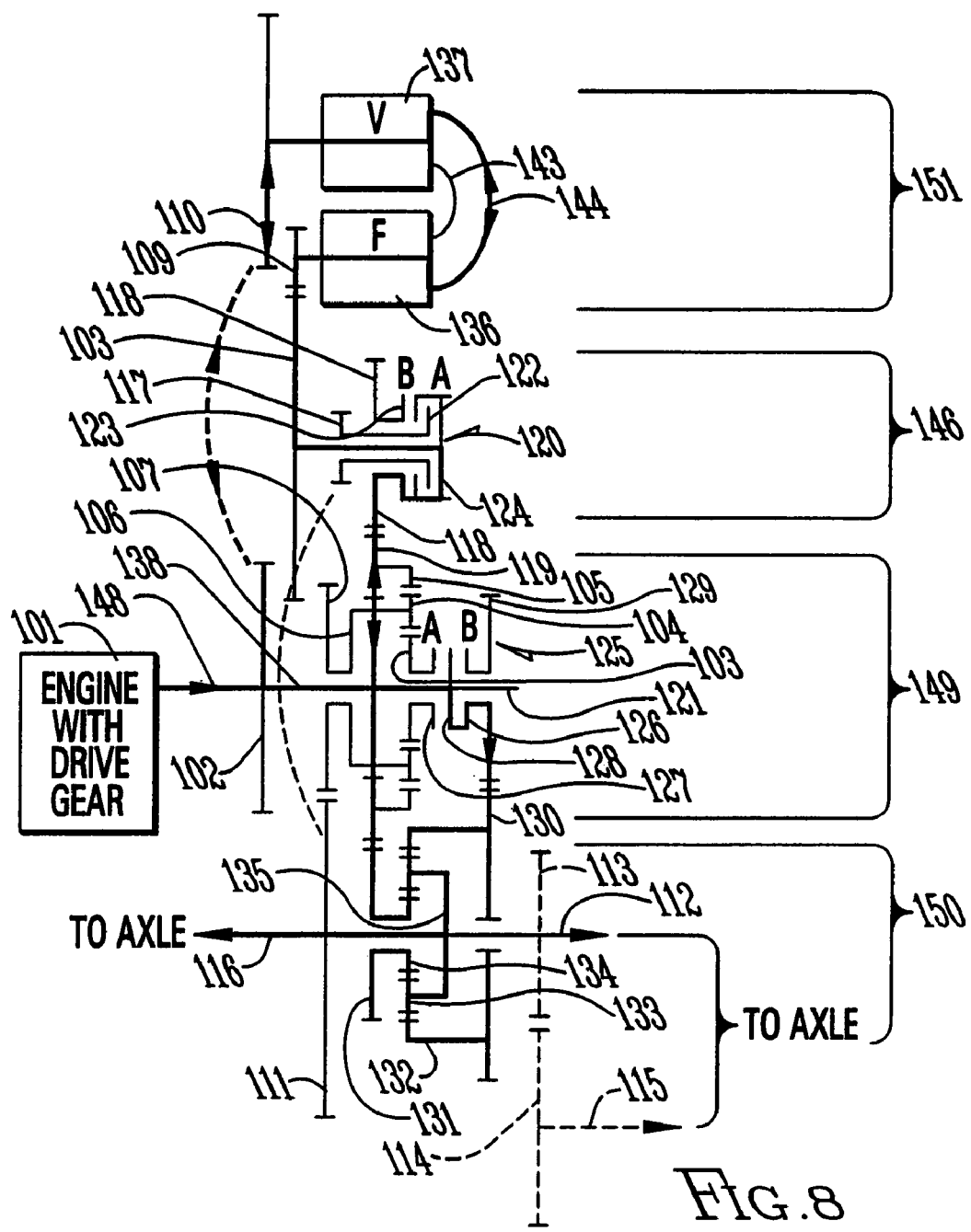
FIG. 8 is a schematic drawing showing a third mode for the circuit of FIG. 5.
Figure 14:
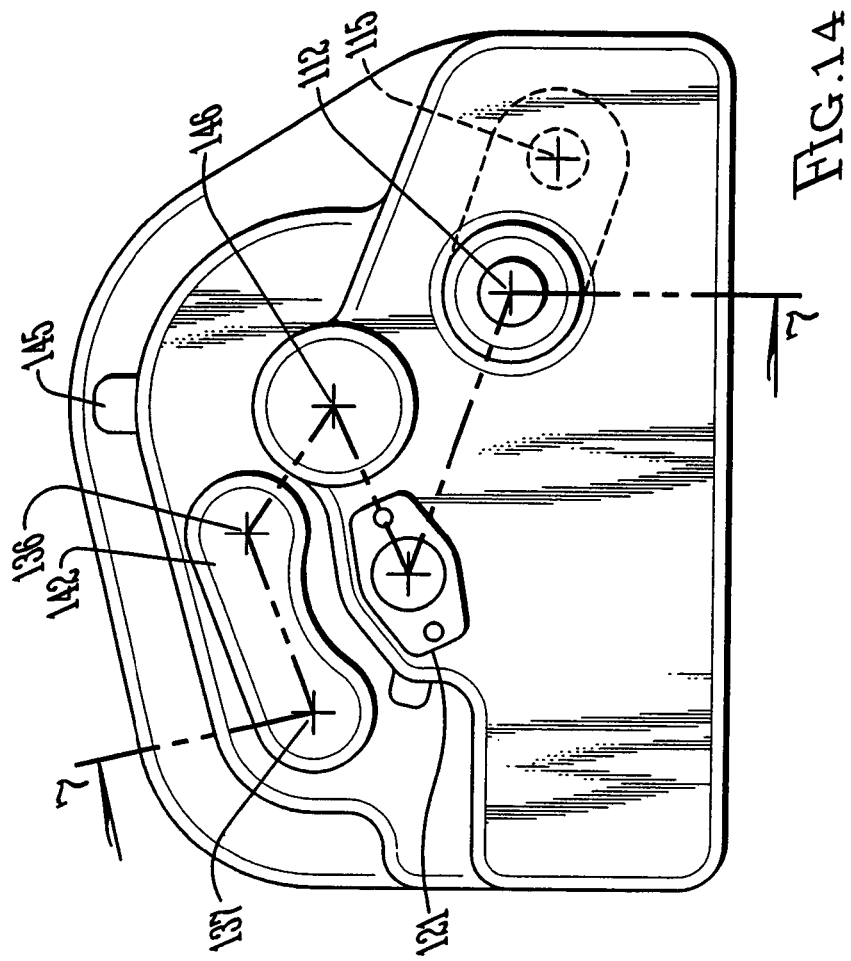
FIG. 14 is a side elevational view of the structure of FIG. 13.
Figure 13:
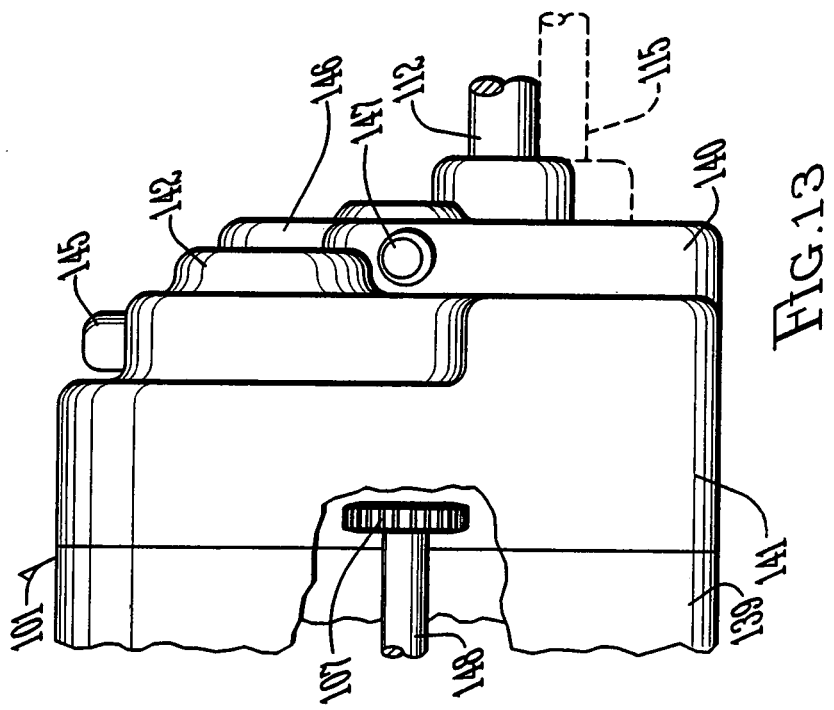
FIG. 13 is an end elevational view of a 3-mode HMT in an engine integration configuration.

Additional modes can be accommodated with the addition of additional clutches and shift actuators. See FIGS. 3–8. See the three mode system in FIG. 5 with planetary 149 and clutch 125. The numerals in FIG. 5 correspond to the numerals in FIGS. 2–4 except that the numerals in FIG. 5 have been increased by a value of 100. Thus, the component 50 in FIGS. 2–4 is 150 in FIG. 5. A additional clutch actuator is accomplished with cylinder 154, yoke 154 and slider 128. The shift sequence is same as for the mode 1 to 2 shift.

An HMT comprises a fixed swashplate control (F-unit) operatively connected to a variable swashplate control (V-unit).

Primary component groups are the hydrostatic transmission 51, jackshaft/clutch 46, input/planetary 49 and the output assembly 50. Primary control elements are actuators 62, 20 and 125, valve 56 and controller 63. In the start-up mode, which is hydrostatic, power from engine 1 travels through shaft 38 to gear set 2/10 into the hydrostatic transmission 51. The V-unit 37 starts at zero stroke and no power is transmitted. As the operator and programmed logic commands, controller 63 signals actuator 62 to stroke swashplate 57 of V-unit 37. As V-unit 37 is stroked to positive displacement by control actuator 62, flow is sent to F-unit 36 through line 43 and rotation of gear set 9/8 starts. Power is delivered to jackshaft 46. Clutch 20 is in the A position, which connects tang 24-1 with slot 22, and power flows to gear set 17/11. As V-unit 37 is stroked fully, output 12, 15, and/or 16 reaches the maximum forward speed for mode 1. Planetary 49 is inactive in mode 1. The stroke control logic for the V-unit which resides in controller 63 may be of any type and may be like that described in U.S. Pat. No. 5,560,203.

At the fully stroked position of V-unit 37, all elements of jackshaft 46 are at the same nominal speed. A shift is initiated by sensor 55-1, which is preferably a swashplate position switch but which may be a continuous sensor, and clutch 20 is shifted. Slider 24 is moved by yoke 56 and cylinder 52 which is supplied by valve 53 and pump 69. Flow to the clutch is regulated by controller 63 which receives the signal from sensor 55-1. When clutch 20 is shifted to the B position, tang 24-2 is connected with slot 23 and power is delivered to gear set 18/19. Note that power is now being delivered to planetary 49 through gear 19 to ring 5, and through shaft 38 to sun 3, creating parallel power paths. Power is transmitted from both paths to planets 4-1, 4-2 and 4-3 to carrier 6, to gear set 7/11 and to output 50. Because ring 19 is speed controlled by HST 51, a variable speed is controlled at output 50. Controller 63 and actuator 62 stroke V-unit 37 from full positive to full negative displacement and output speed delivered through gear set 7/11 reaches maximum for mode 2.

After the shift of clutch 20 to position B, power flows from F-unit 36 to V-unit 37 and the pressure in HST 51 switches to line 44. In the second half of mode 2, V-unit angle strokes over zero to a negative displacement, the power flow is reversed again and is transmitted from V-unit 37 to F-unit 36. The stroke control logic for V-unit 37 in controller 63 is consistent with mode 1.

A 3-mode HMT is shown in FIGS. 5, 6, 7, 8, 9, 10, 11, 13, 14 and 15. The 3-mode HMT is similar to the 2-mode described above with the addition of planetary/gears 150 and the clutch 125. Note that the numbered elements for the 3-mode are the same configuration as the 2-mode with the addition of 100 (i.e.; HST 51 for the 2-mode is HST 151 for the 3-mode). The gear ratios may be different to accommodate different torque/speed ratio spreads. In mode 2, clutch 125 is in position A which connects sun 103 to the input shaft 138 through tang 128-1 to slot 127. This is the same power flow as in the 2-mode transmission.

At the end of mode 2, V-unit 137 is fully stroked in a negative direction and HST power is flowing from V-unit 137 to F-unit 136 in line 144. At this condition, all elements of clutch 125 are at the same nominal speed. Swashplate sensor 155-2 initiates a shift and controller 63 sends a signal to valve 167, which controls the pressure in cylinder 154 and moves yoke 157. Slider 128 moves to engage tang 128-2 in slot 126 and gear set 129/130 becomes driven by the input shaft 138, enabling power flow in planetary 150 through ring 132. Sun 103 becomes disengaged from the input shaft 138 and turns free, preventing power flow in planetary 149. Note that power to planetary 150 is also delivered through gear sets 118/119/131 from F-unit 136 to sun 134, creating a parallel power path. Controller 63 and actuator 62 stroke V-unit 137 from full negative to full positive displacement, first reducing the speed of F-unit 136 to zero and then increasing it to full positive speed. This allows variable speed from F-unit 136 to regulate sun 134, and a fixed speed from input 138 to determine ring 130 speed, raising output speed to its maximum value.

After the shift of clutch 149 to position B, the pressure in HST 151 switches to line 143 and power flows from F-unit 136 to V-unit 137. When V-unit 137 angle strokes over zero to a negative displacement, the power flow is reversed and flows from V-unit 137 to F-unit 136. The stroke control logic for V-unit 137 in controller 63 is consistent with mode 1 and 2.

The hydrostatic transmission 51(151) is the same for both the three mode and two mode versions. It is sized to provide adequate power for a low power, low ratio transmission in a 2 mode transmission, and for higher power, higher ratio requirements in a three mode transmission. The speeds and planetary ratios can be adjusted to accommodate the various vehicle requirements, over approximately a 2:1 spread in either variable. When individual mode ratio spreads are reduced, input power capacity increases. When modes are added, transmission ratio spread or input power is increased or both, depending on how the gears ratios and planetary ratios are selected.

There is great flexibility in the selection of gear ratios or planetary ratios within a generally close physical location for each functional group. The jackshaft 46 (146) has one drive from F-unit 36 (136) and another from output group 50 (150), which are on three different centerlines. This allows large changes in gear ratio on both mating functional groups of the jackshaft with small changes in jackshaft centerline. Also, planetary 49 (149), which is the mode 2 power summer, is input driven at sun 3 (103); ring 5 (105) is driven by F-unit 36 (136), and carrier 106 is out. This permits ease of power delivery to the three summer members and allows flexibility in selecting a ratio for planetary 46 (146) to vary the ratio spread. Planetary 150 is input driven at ring 132, F-unit driven at sun 134, and carrier 135 is again out. This provides for ease of power delivery and flexibility for selecting planetary 150 ratio. Note that moving the gear centerlines to accommodate various vehicle needs for input and output locations and four gear ratios may be done with housing 141 unchanged.

The five main functional groups 37 (137), 36 (136), 46 (146), 49 (149), and 50 (150) are all located on a different centerline. In addition to facilitating gear ratio flexibility, this allows the overall transmission length to remain short.

The planetary 46 (146) and 150 configurations, with the carrier as output, facilitate through drive for the input to PTO and the output for front and rear drive. This is also facilitated by having limited functionality on each centerline.

The housing construction supports the ability to alter gear ratios and planetary ratios in a cost efficient manner. (FIGS. 11 through 15). Center housing 141 which is used for all versions, contains the complex design features for the V-unit 137 and F-unit 136, which are the same for all versions of the transmission. Housing 141 also contains the actuator for mode 2 clutch 120 which is used for all versions. The clutch actuator includes cylinder 52, yoke 56 and valve 53 (See FIG. 1). Housing 141 would also contain the means to stroke swashplate 57 and for mounting sensors 55-1 and 155-2. Housing 141 has space and features for the hydraulic reservoir 159. The rear surface 160 of housing 141 is flat and accepts mounting of both manifold 142 and end cover 140.

Manifold 142 which contains lines 143 and 144 is the same for all versions and is attached to the rear surface 160 of housing 141. Manifold 142 may also contain other HST circuit elements such as pump 69, check valves 65-1 and 65-2, and crossport valve 56.

The end covers 139 and 140 contain the bearing supports 158-1, 2, etc. for jackshaft/clutch 146, input/planetary 149, planetary/output 150 and output shaft 115 if used, and are adjusted in location to accommodate different shaft centerline locations as gear ratios change and as output shaft locations change. End cover 139 is changeable in configuration to accommodate different engine mounting configurations, including integration with the engine housing. Housing elements 168 are configured to adapt to the engine structure. In the case illustrated, the transmission input gear 107 is also the gear that drives the engine camshaft or countershaft, however, the gear could be separate from the engine if desired. In addition to gear ratio differences, end cover 140 is changeable to accommodate either 2-mode or 3-mode transmissions. The actuator for clutch 125 is located in end cover 140 if needed for the 3-mode transmission, and includes valve 167, cylinder 154 and yoke 157. End cover 140 may also be configured to include the mounting flange 166 for an engine driven PTO 121. Both end cover 139 and 140 form the ends of reservoir 159.

The benefits of the invention are as follows:

1. It provides an HMT with either two or three modes which depend on the application requirement. The third mode is independent in ratio spread from the other two modes. The third mode is accomplished with the addition of a planetary, associated drive gears and one clutch to the basic 2-mode package.
2. It provides for the ability to change all gears ratios in order to accommodate various input speeds, output speeds and ratio spread requirements. This is accomplished with each functional power transmitting group having its own centerline location. This also allows for short transmission length.
3. It provides a transmission configuration which allows for through power transmission from the engine to the opposite end of the transmission and for through power transmission of the output shaft to either or both ends. This is facilitated by having the planetary carrier be the output member. One end of the output shaft may optionally be displaced radially from the other end.
4. It provides a transmission configuration which has a center housing portion which contains features and location for two hydrostatic units including shafts and drive gears, the hydraulic reservoir and one set of clutch shift means, and which is common across the range of transmission applications. The two end covers for the center portion contain the features and location for the mechanical shafts, non-HST drive gears, engine mounting, PTO drive and a second set of clutch shift means.
5. It allows for integration and common usage of one or more engine/transmission features including gears, hydraulic pump, housing and/or controller.

It is therefore seen that this invention will achieve at least all of its objectives.

I claim:

1. A small engine transmission, comprising:
a hydromechanical transmission unit which has rotational elements including a fixed swashplate control hydrostatic unit and a variable swashplate control hydrostatic unit, an input shaft and an output shaft each with a separate rotational centerline, and providing a first power path,
a mechanical power transmission unit providing a second power path in parallel with the first power path,
the mechanical power transmission unit being a planetary gear system having a planetary carrier and a clutch operatively associated with the hydromechanical transmission unit;
wherein the planetary carrier is located on the input shaft; and
wherein the clutch is located on a centerline different than the output shaft, the fixed swashplate control hydrostatic unit, the variable swashplate control hydrostatic unit, and the input shaft.

2. The transmission of claim 1 wherein the planetary carrier is an output member for the small engine transmission.

3. The transmission of claim 1 wherein the transmission has three modes of operation and wherein the third mode of operation is accomplished by adding a second planetary carrier, at least two drive gears and a second clutch.

4. The transmission of claim 3 wherein a controller is associated with the small engine transmission to control the implementation of multiple modes.

5. The transmission unit of claim 1 wherein the fixed swashplate control hydrostatic unit, variable swashplate control hydrostatic unit, input shaft and output shaft, rotate about separate individual axes to permit a shorter transmission length, and to accommodate different gear ratios.

6. The transmission of claim 1 wherein a jackshaft is operatively associated with the fixed swashplate control hydrostatic unit and the output shaft and has its own separate axis of rotation.

7. The transmission of claim 3 wherein the planetary carrier is an output member to facilitate a transmission configuration which allows for through power transmission of the output member to either or both of opposite ends of the transmission.

8. The transmission of claim 1 further comprising an engine driven power-take-off (PTO) located on the input shaft centerline.

9. The transmission of claim 3 wherein the second planetary carrier is connected to the output shaft.

10. A small engine transmission, comprising:
a hydromechanical transmission unit which has rotational elements including a fixed swashplate control hydrostatic unit and a variable swashplate control hydrostatic unit, an input shaft and an output shaft each with a separate rotational centerline, and providing a first power path,
a mechanical power transmission unit providing a second power path in parallel with the first power path,
the mechanical power transmission unit being a planetary gear system having a planetary carrier and a first clutch operatively associated with the hydromechanical transmission unit;
wherein the planetary carrier is located on the input shaft;
wherein the clutch is located on a centerline different than the output shaft, the fixed swashplate control hydrostatic unit, the variable swashplate control hydrostatic unit, and the input shaft;
wherein the transmission has three modes of operation and wherein the third mode of operation is accomplished by adding a second planetary carrier, at least two drive gears and a second clutch; and
wherein the second planetary carrier is located on a different rotational centerline than the input shaft and the fixed swashplate control hydrostatic unit, and is gear driven from the input shaft and the fixed swashplate control hydrostatic unit.

11. The transmission of claim 10 wherein the second planetary carrier is connected to the output shaft.

12. A small engine transmission, comprising,
a center housing,
a pair of hydrostatic units in the center housing and including shafts and drive gears, a hydraulic reservoir,
a pair of end covers on opposite ends of the center housing and containing at least one of mechanical shafts, non-hydrostatic transmission drive gears, and transmission mounting; and
wherein the center housing and covers include adaptive means for assembling the transmission as either a two mode or three mode transmission.

13. The transmission of claim 12 where the center housing configuration also contains a solenoid, a valve and a yoke for shifting the first clutch assembly.

14. The transmission of claim 12 wherein the center housing also contains components for a first operation mode and a first clutch assembly.

15. The transmission of claim 12 wherein the transmission allows for one or more common engine/transmission features including at least one of gears, hydraulic pump, housing or controller components and functions.

* * * * *